(12) United States Patent
Fujisawa

(10) Patent No.: US 7,903,773 B2
(45) Date of Patent: Mar. 8, 2011

(54) SERIAL DATA PROCESSING CIRCUIT

(75) Inventor: Hisanori Fujisawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 252 days.

(21) Appl. No.: 12/269,172

(22) Filed: Nov. 12, 2008

(65) Prior Publication Data

US 2009/0249025 A1    Oct. 1, 2009

(30) Foreign Application Priority Data

Mar. 27, 2008    (JP) ................................ 2008-084468

(51) Int. Cl.
*H04L 7/00* (2006.01)

(52) U.S. Cl. ......... 375/354; 375/355; 375/326; 375/327; 375/376

(58) Field of Classification Search .................. 375/340, 375/354, 355, 372
See application file for complete search history.

(56) References Cited

U.S. PATENT DOCUMENTS

| 5,459,843 | A | 10/1995 | Davis et al. |
| 7,254,205 | B2 * | 8/2007 | Gabara et al. ................. 375/355 |
| 7,340,021 | B1 * | 3/2008 | Churchill et al. ............ 375/354 |
| 7,440,532 | B1 * | 10/2008 | Chang ........................... 375/372 |
| 2006/0004992 | A1 | 1/2006 | Fujisawa et al. |
| 2008/0165902 | A1 * | 7/2008 | Moriwaki ..................... 375/340 |

FOREIGN PATENT DOCUMENTS

| JP | 5-224929 | 9/1993 |
| JP | 2006-18539 | 1/2006 |

* cited by examiner

*Primary Examiner* — Vibol Tan
(74) *Attorney, Agent, or Firm* — Fujitsu Patent Center

(57) ABSTRACT

A serial data processing circuit that realizes the same performance as that of the pipeline processing with low power consumption. First to fourth latch units receive, in parallel, data sets supplied to a logic circuit. These latch units sequentially latch the data sets sequentially supplied to the logic circuit and output N data sets in parallel. A Selector sequentially selects the data sets supplied from these latch units and supplies the selected data sets to the logical circuit. For example, when the first latch unit latches data (a), the selector selects the data (a) and supplies it to the logic circuit. When the second latch unit latches data (b), the selector selects the data (b) and supplies it to the logic circuit. The logic circuit processes N serial data sets during each cycle.

12 Claims, 12 Drawing Sheets

SERIAL DATA PROCESSING CIRCUIT

CROSS-REFERENCE TO RELATED APPLICATIONS

This application is based upon and claims the benefits of priority from the prior Japanese Patent Application No. 2008-084468 filed on Mar. 27, 2008, the entire contents of which are incorporated herein by reference.

BACKGROUND OF THE INVENTION

1. Field of the Invention

The present invention relates to a serial data processing circuit and, more particularly, to a serial data processing circuit for processing N serial signals during each clock cycle.

2. Description of the Related Art

A super pipeline technology is used to improve performance of LSI (Large Scale Integration) circuits. Specifically, a combinational circuit between FF (Flip-Flop) circuits is divided into a plurality of combinational circuits and one or more FF circuits are then inserted between the divided combinational circuits to serially connect the combinational circuits, thereby realizing serial data processing. This technology could increase the operating frequency of the entire combinational circuit, thereby improving the throughput performance.

Conventionally known is a pipelined RISC (Reduced Instruction Set Computer) type processor to be driven by a parallel mode (see, for example, Japanese Unexamined Patent Publication No. Hei 5-224929).

The super pipeline technology, however, has a problem of causing increase in power consumption.

SUMMARY OF THE INVENTION

In view of the foregoing, it is an object of the present invention to provide a serial data processing circuit that processes serial data with low power consumption.

To accomplish the above-described object, there is provided a serial data processing circuit. This serial data processing circuit comprises: a latch unit including n latches connected to output signal lines from a logic circuit to sequentially latch output data sets from the logic circuit and to output N data sets in parallel; and a selector for sequentially selecting the data sets supplied from the latch unit and converting the sequentially selected data sets into serial data for one signal line to supply the serial data to the next logic circuit.

The above and other objects, features and advantages of the present invention will become apparent from the following description when taken in conjunction with the accompanying drawings which illustrate preferred embodiments of the present invention by way of example.

DESCRIPTION OF THE PREFERRED EMBODIMENTS

Figure 1:
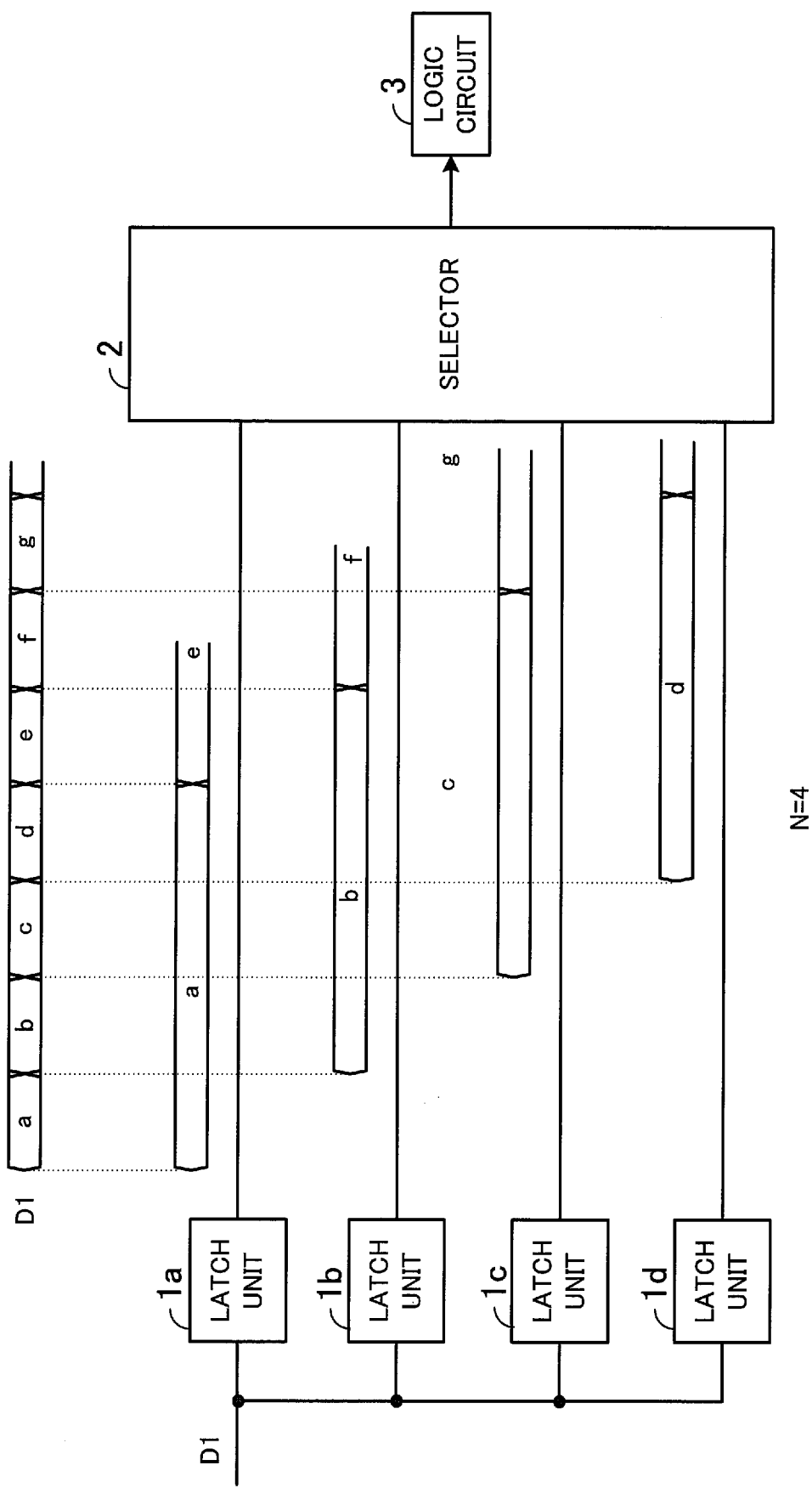
FIG. 1 outlines a serial data processing circuit according to the present invention.

Preferred embodiments of the present invention will be described in detail below with reference to the accompanying drawings, wherein like reference numerals refer to like elements throughout.

FIG. 1 outlines a serial data processing circuit according to the present invention. Specifically, FIG. 1 shows latch units 1a to 1d, a selector 2, a logic circuit 3 that processes N data sets during each clock cycle, and data D1 supplied to the logic circuit 3.

The respective latch units 1a to 1d receive, in parallel, data sets supplied to the logic circuit 3 or data sets produced by a combinational circuit within the logic circuit 3. FIG. 1 shows a case where the latch units 1a to 1d receive, in parallel, the data D1 supplied to the logic circuit 3. In order to process N serial data sets in the logic circuit 3, N latch units are connected in parallel to each other. FIG. 1 shows an example where the logic circuit 3 processes four (N=4) serial data sets.

The latch units 1a to 1d sequentially latch the data sets D1 sequentially supplied to the logic circuit and output N data sets in parallel. Suppose, for example, that the logic circuit sequentially receives the data sets D1 including data (a), data (b), data (c), data (d), data (e), . . . . In this case, outputs from the latch units 1a to 1d are as shown in FIG. 1.

The selector 2 sequentially selects the data sets D1 supplied from the latch units 1a to 1d and supplies the selected data to the logic circuit 3. For example, when the latch unit 1a latches data (a), the selector 2 selects the data (a) and supplies it to the logic circuit 3. When the latch unit 1b latches data (b), the selector 2 selects the data (b) and supplies it to the logic circuit 3. As a result, the logic circuit 3 can process N serial data sets.

As described above, the serial data processing circuit sequentially latches the data sets D1 supplied to the logic circuit 3 or the data sets produced by the logic circuit 3, and outputs N data sets in parallel. Then, the serial data processing circuit sequentially selects the latched data sets D1 and supplies the selected data to the logic circuit. As a result, the present embodiment realizes the same performance as that of pipeline processing with low power consumption.

Next, an embodiment of the present invention will be described in detail with reference to the accompanying drawings.

Figure 2:
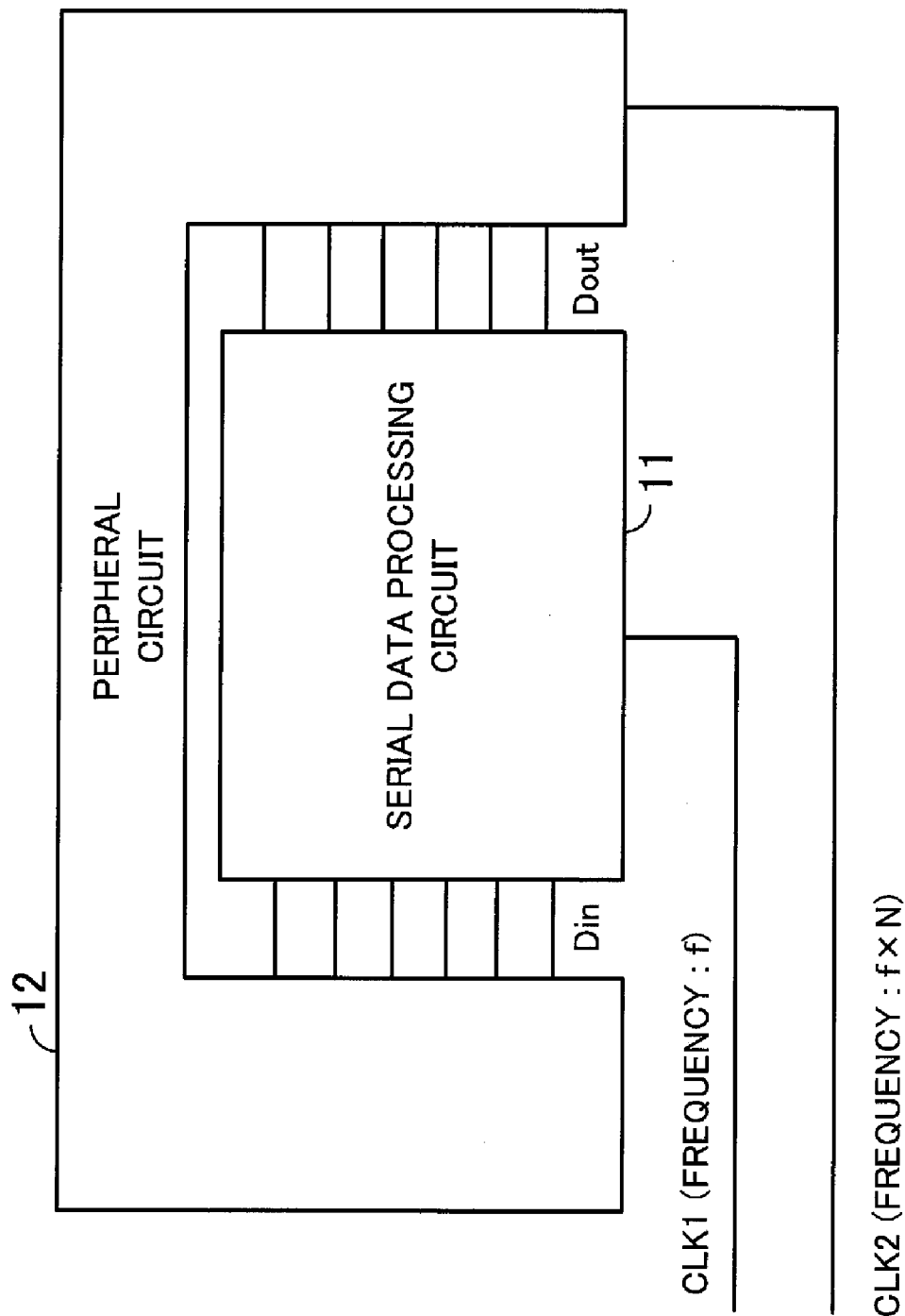
FIG. 2 is a block diagram of a data processor to which the serial data processing circuit of the invention is applied.

FIG. 2 is a block diagram of a data processor to which the serial data processing circuit of the invention is applied. The data processor shown in FIG. 2 performs processing such as digital filtering. The data processor has a serial data processing circuit 11 and a peripheral circuit 12.

The serial data processing circuit 11 receives data Din from the peripheral circuit 12. The serial data processing circuit 11 performs predetermined processing on the incoming data Din and supplies data Dout to the peripheral circuit 12. The serial data processing circuit 11 operates in synchronization with a clock CLK1 having a frequency f. The peripheral circuit 12 operates in synchronization with a clock CLK2 having a frequency f×N, where the symbol N is a positive integer indicating the number of data sets to be processed during each clock cycle.

Figure 3:
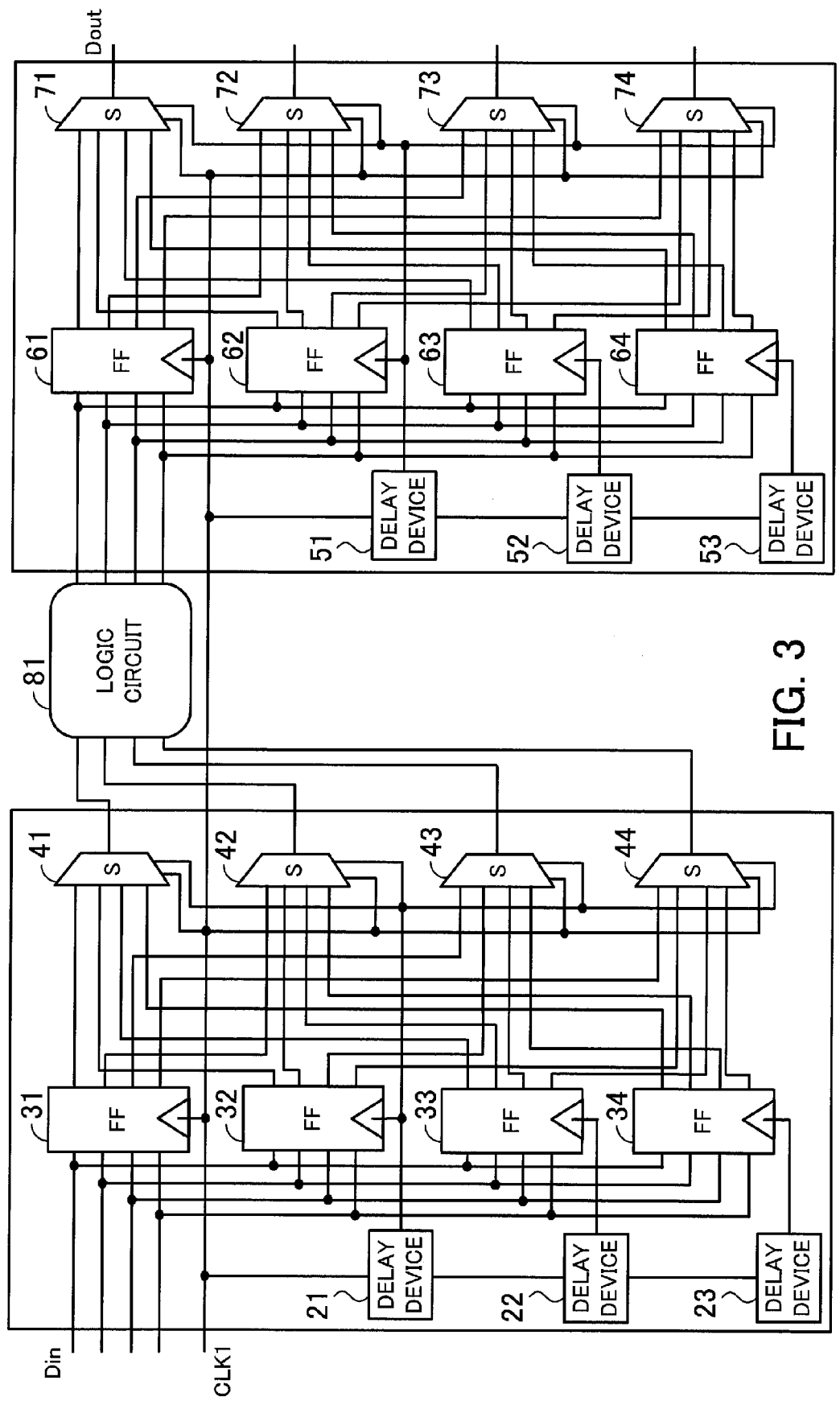
FIG. 3 is a block diagram of the serial data processing circuit.

FIG. 3 is a block diagram of the serial data processing circuit 11. As shown in FIG. 3, the serial data processing circuit 11 has delay devices 21 to 23 and 51 to 53, FF circuits 31 to 34 and 61 to 64, selectors 41 to 44 and 71 to 74, and logic circuit 81. The logic circuit 81 performs predetermined operations such as addition and bit shifting.

The delay devices 21 to 23 delay phases of the incoming clocks CLK1 by $2\pi/N$ and produce the delayed clocks CLK1. The symbol N indicates the number of serial data sets. FIG. 3 shows the serial data processing circuit in the case of processing four serial data sets. The delay devices 21 to 23 produce the clocks CLK1 phase-shifted from each other by $\pi/2$ (by ¼ cycle).

The FF circuits 31 to 34 are inserted in parallel in the upstream of the logic circuit 81 according to the number of data sets to be processed. FIG. 3 shows an example of processing four serial data sets in the logic circuit 81, in which four FF circuits 31 to 34 are inserted in parallel.

The FF circuits 31 to 34 receive a clock CLK1 and clocks CLK1 with phases delayed by the delay devices 21 to 23, respectively. The FF circuits 31 to 34 sequentially latch the data sets Din in synchronization with the incoming clocks CLK1. In the case of the example of FIG. 3, the FF circuits 31 to 34 sequentially latch the incoming data sets Din at timings of the clocks CLK1 phase-shifted from each other by $\pi/2$.

The FF circuits 31 to 34 receive in parallel the data sets Din supplied from the peripheral circuit 12. The data sets Din are those processed during each clock cycle. The data sets Din are those supplied from the peripheral circuit 12. Frequencies of the data sets Din are set to be f×N.

Suppose, for example, that the FF circuits 31 to 34 receive the data sets Din including data (a), data (b), data (c), data (d), data (e), . . . having a frequency f×N from the peripheral circuit 12. In this case, the FF circuits 31 to 34 perform a latch operation as follows. First, the FF circuit 31 latches the data (a) in synchronization with a clock CLK1 having a frequency f. Next, the FF circuit 32 latches the data (b) in synchronization with a clock CLK1 phase-shifted by ¼ cycle from the clock CLK1 supplied to the FF circuit 31. Next, the FF circuit 33 latches the data (c) in synchronization with a clock CLK1 phase-shifted by ¼ cycle from the clock CLK1 supplied to the FF circuit 32. Next, the FF circuit 34 latches the data (d) in synchronization with a clock CLK1 phase-shifted by ¼ cycle from the clock CLK1 supplied to the FF circuit 33. Next, the FF circuit 31 latches the data (e) in synchronization with a clock CLK1 having a frequency f. Hereinafter, the same operation is repeated.

The selectors 41 to 44 receive the data sets latched by the FF circuits 31 to 34. Further, the selectors 41 to 44 receive a clock CLK1 and a clock CLK1 delayed by the delay device 21. The selectors 41 to 44 sequentially select, based on the two incoming clocks CLK1, the data sets Din latched by the FF circuits 31 to 34 and supply the selected data to the logic circuit 81.

In the case of an example of FIG. 3, the selectors 41 to 44 receive a clock CLK1 and a clock CLK1 phase-shifted by $\pi/2$ from the clock CLK1. Accordingly, the selectors 41 to 44 receive a signal with four states of '0, 0', '0, 1', '1, 0' and '1, 1' during each cycle of the clock CLK1. Therefore, the selectors 41 to 44 sequentially select the data sets Din latched by the FF circuits 31 to 34 and supply the selected data Din to the logic circuit 81. For example, when the FF circuit 31 latches a data set, the selectors 41 to 44 select the data set latched by the FF circuit 31 and supply it to the logic circuit 81. When the FF circuit 32 latches a data set, the selectors 41 to 44 select the data set latched by the FF circuit 32 and supply it to the logic circuit 81.

Therefore, according to the above-described example where the FF circuits 31 to 34 receive the data sets Din including data (a), data (b), data (c), data (d), data (e), . . . , the selectors 41 to 44 supply the data sets including data (a), data (b), data (c), data (d), data (e), . . . having a frequency (f×4) to the logic circuit 81.

For selection signals supplied to the selectors 41 to 44, CEIL (Log (N)) clocks are selected from N clocks CLK1 having different phases. For example, in the case of N=2, one clock is selected from two clocks having different phases and used as a selection signal. In the case of N=4 (in the case of the example of FIG. 3), two clocks (in the case of the example of FIG. 3, a clock CLK1 and a clock CLK1 delayed by the delay device 21) are selected from four clocks having different phases and used as selection signals.

In the logic circuit 81, the output side has the same structure and performs the same operation as those of the above-described input side. Delay devices 51 to 53 delay phases of the incoming clocks CLK1 by $2\pi/N$ and produce the delayed clocks CLK1. In the case of the example of FIG. 3, the delay devices 51 to 53 produce the clocks CLK1 phase-shifted from each other by $\pi/2$.

The FF circuits 61 to 64 receive a clock CLK1 and clocks CLK1 with phases delayed by the delay devices 51 to 53, respectively. The FF circuits 61 to 64 sequentially latch, in synchronization with the incoming clocks CLK1, the data sets Din supplied from the logic circuit 81. In the case of the example of FIG. 3, the FF circuits 61 to 64 sequentially latch the incoming data sets Din at timings of the clocks CLK1 phase-shifted from each other by $\pi/2$.

The selectors 71 to 74 receive the data sets latched by the FF circuits 61 to 64. Further, the selectors 71 to 74 receive a clock CLK1 and a clock CLK1 delayed by the delay device 51. The selectors 71 to 74 sequentially select, based on the clock CLK1 and the delayed clock CLK1, the data sets Din latched by the FF circuits 61 to 64 and supply the selected data to the peripheral circuit 12.

In FIG. 3, the delay devices 21 to 23 and 51 to 53, the FF circuits 31 to 34 and 61 to 64, and the selectors 41 to 44 and 71 to 74 are provided on the input side and the output side of the logic circuit 81, respectively. These elements may be provided only on either of the input side or the output side of the logic circuit 81.

Further, the delay devices 21 to 23, the FF circuits 31 to 34, and the selectors 41 to 44 may be inserted in the logic circuit 81.

Figure 4:
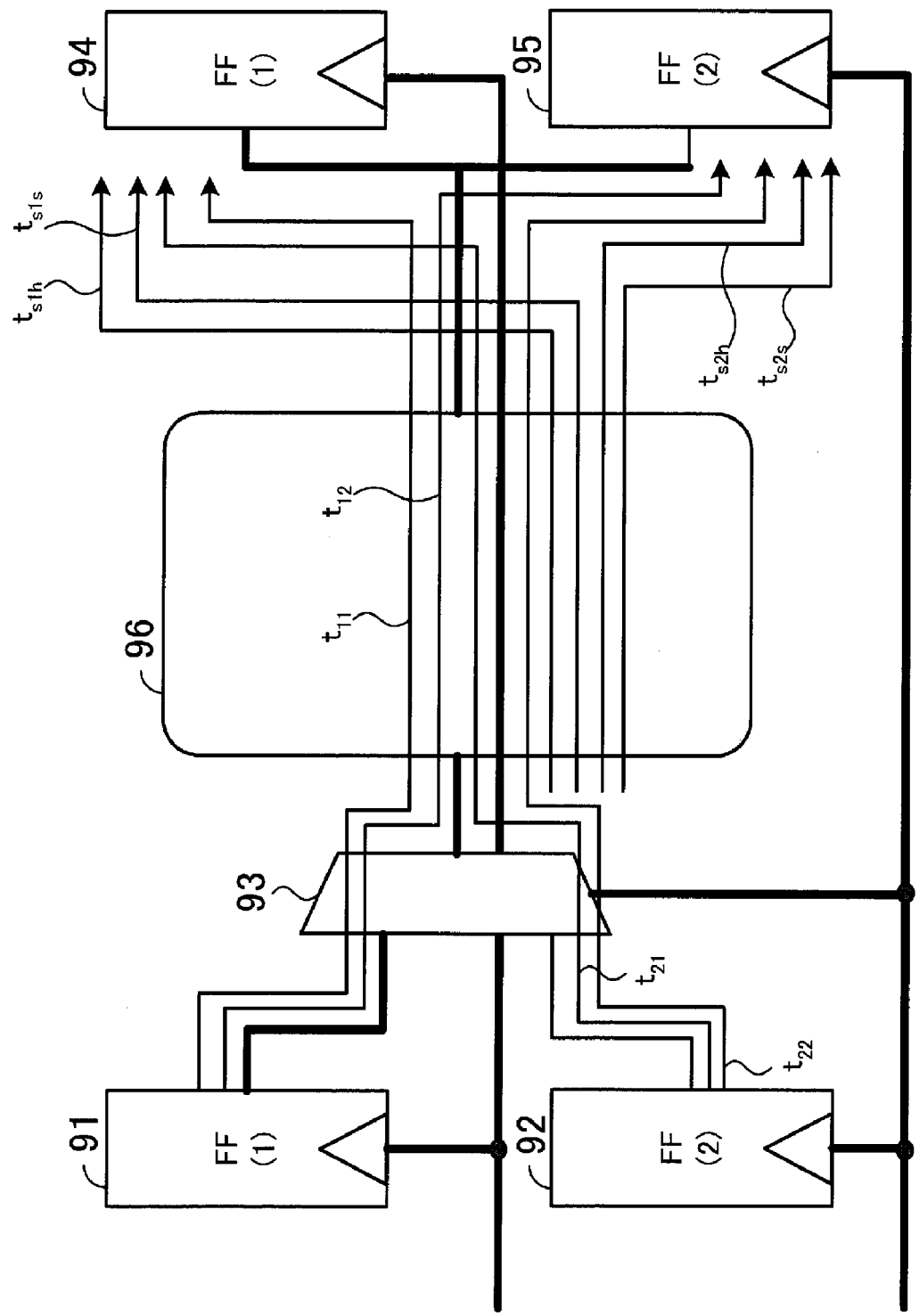
FIG. 4 illustrates timing control.

FIG. 4 illustrates a timing control. FIG. 4 shows an example of a serial data processing circuit in the case of processing two serial data sets in a logic circuit. As shown in FIG. 4, the serial data processing circuit has FF circuits 91, 92, 94 and 95, a selector 93, and a logic circuit 96.

The FF circuits 91 and 94 operate in synchronization with the same clock, while the FF circuits 92 and 95 operate in synchronization with the same clock. The clock with which the FF circuits 91 and 94 operate is phase-shifted by $\pi$ from the clock with which the FF circuits 92 and 95 operate.

The selector 93 receives the same clock as that supplied to the FF circuits 92 and 95. The selector 93 sequentially selects the incoming data sets based on the state '0 or 1' of this clock and supplies the selected data to the logic circuit 96.

When synthesizing data sets on the output side of the logic circuit 96, a timing control must be performed such that the data sets propagate only between the FF circuits that operate with clocks having the same phase, while the data sets are prevented from propagating between the FF circuits that operate with clocks having different phases.

Referring, for example, to FIG. 4, the FF circuits 91 and 94 operate with clocks having the same phase, while the FF circuits 91 and 95 operate with clocks having different phases. In synthesis of data sets, the timing control must be performed such that the FF circuit 94 is prevented from latching a data set propagating from the FF circuit 92, while the FF circuit 95 is prevented from latching a data set propagating from the FF circuit 91.

Specifically, when a data set propagating from one FF circuit will arrive at another FF circuit that operates with a clock having a different phase, the minimum propagation time must be made longer than a hold time of an FF circuit for the data set to arrive at. Further, when a data set selected by a selector will arrive at an FF circuit for the data set to be latched, the arrival timing of the data must be set as setup conditions, whereas when a data set selected by a selector will arrive at an FF circuit for the data set not to be latched, the arrival timing of the data must be set as hold conditions.

Figure 5:
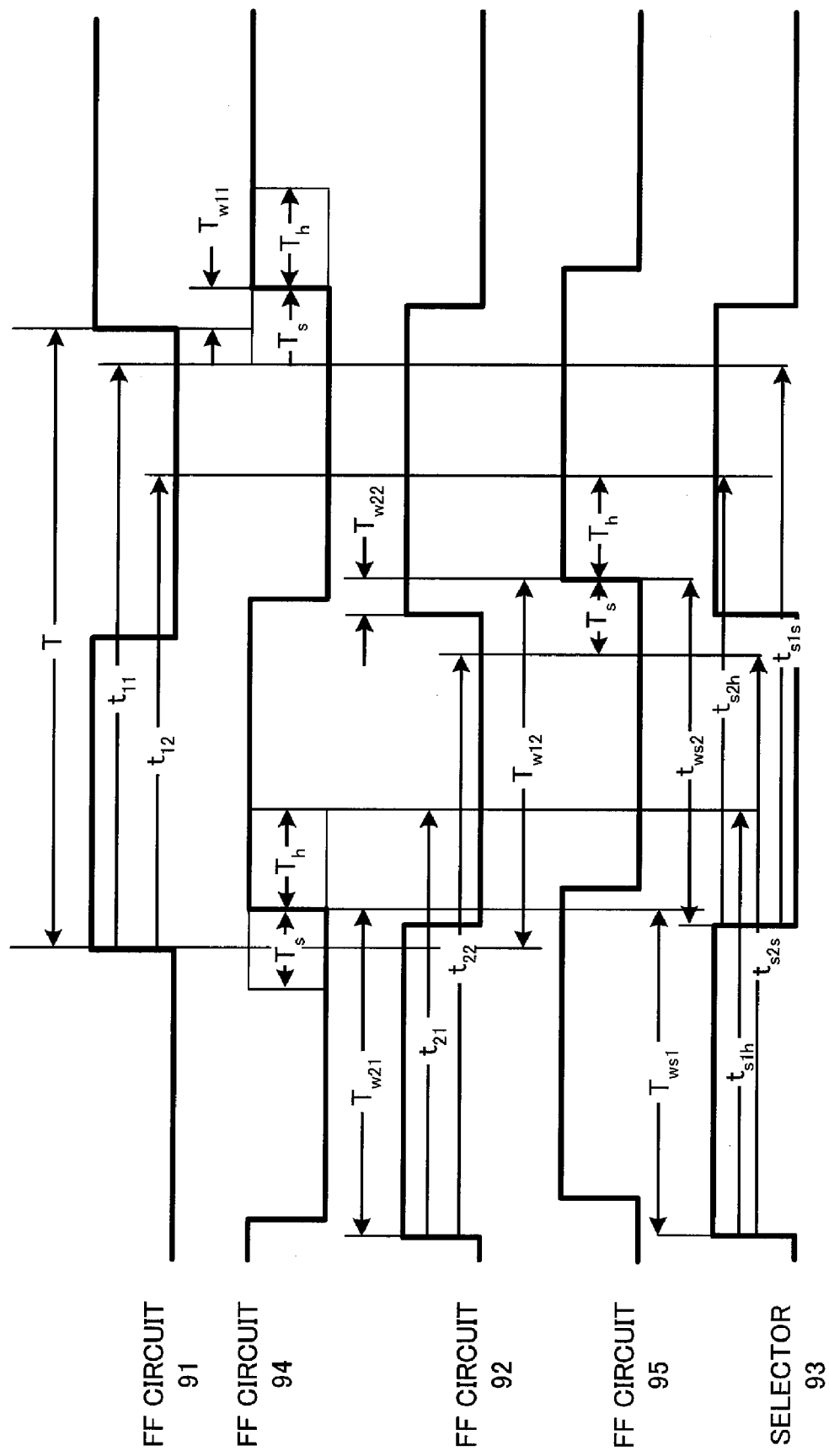
FIG. 5 shows timings between signals of FIG. 4.

FIG. 5 shows timings between signals in FIG. 4. Specifically, FIG. 5 shows timings between clocks supplied to the FF circuits 91, 92, 94 and 95, and the selector 93 of FIG. 4. The FF circuits 91 and 94 receive clocks having the same phase; however, input timings of the clocks are a little deviated from each other due to a clock skew. Likewise, the FF circuits 92 and 95 receive clocks having the same phase; however, input timings of the clocks are a little deviated from each other due to a clock skew. A clock supplied to the FF circuit 92 has the same phase as that of a clock supplied to the selector 93.

Meanings of the respective symbols in FIG. 5 are as follows. Note, however, that the number 1 or 2 corresponding to the FF circuit 91 or 92 is applicable to "i", while the number 1 or 2 corresponding to the FF circuit 94 or 95 is applicable to "j".

T: clock cycle
Ts: setup time of FF circuit
Th: hold time of FF circuit
tij: signal propagation time between FF circuit i and FF circuit j
tsj: signal propagation time between selector and FF circuit j
Twij: clock skew of FF circuit j to FF circuit i
Twsj: clock skew of FF circuit j to selector
Ts1s: setup time between selector 93 and FF circuit 94
Ts2s: setup time between selector 93 and FF circuit 95
Ts1h: hold time between selector 93 and FF circuit 94
Ts2h: hold time between selector 93 and FF circuit 95

The setup conditions are as described below.

$t11 < T + Tw11 - Ts$ $t22 < T + Tw22 - Ts$ $Ts1s < T + Tws2 - Tw12 + Tw11 - Ts$ $Ts2s < T + Tws1 - Tw21 + Tw22 - Ts$

The hold conditions are as described below.

$t12 > Tw12 + Th$ $t21 > Tw21 + Th$ $Ts1h > Tws1 + Th$ $Ts2h > Tws2 + Th$

As described above, the logic circuit 96 receives the data sets in the number equal to the number of clocks (two clocks in FIG. 4) having different phases and processes these data sets during each clock cycle. The respective data sets are separated by the timing control, and therefore, the data sets propagate between the FF circuits that operate in synchronization with clocks having the same phase. As a result, the present embodiment processes a plurality of data sets (the number of the data sets is equal to the number of clocks having different phases) during each clock cycle.

Figure 6:
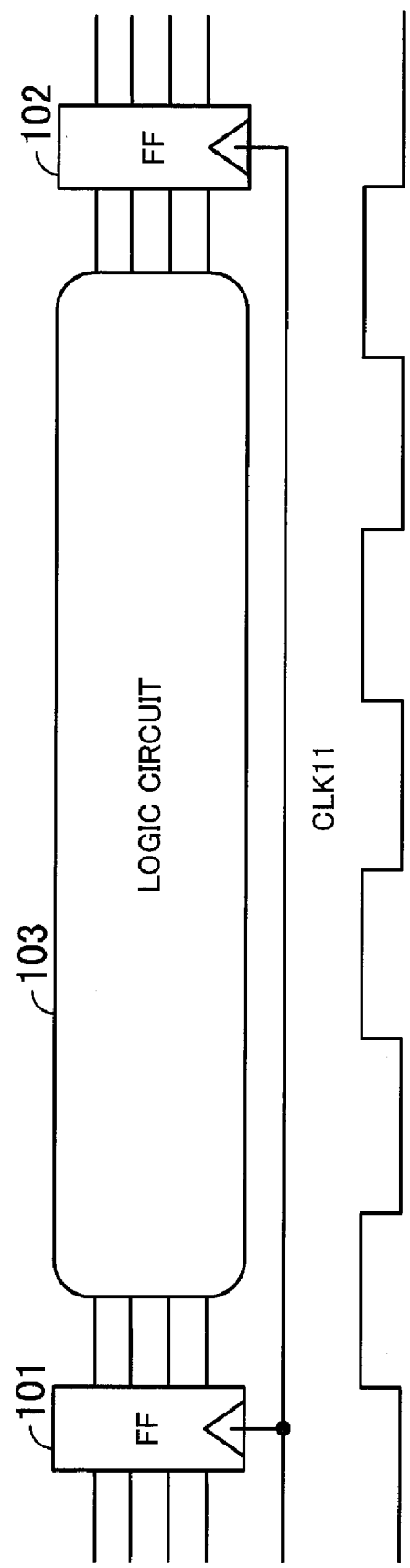
FIG. 6 is a block diagram of a logic circuit where serial data processing is not yet realized.

FIG. 6 is a block diagram of a logic circuit where serial data processing is not yet realized. FIG. 6 shows FF circuits 101 and 102, and a logic circuit 103. The FF circuits 101 and 102 receive a clock CLK11. The FF circuit 101 latches incoming data in synchronization with the clock CLK11 and supplies the latched data to the logic circuit 103. The logic circuit 103 performs operations such as addition and shift of the data and supplies the processed data to the FF circuit 102. The FF circuit 102 latches, in synchronization with the clock CLK11, the data supplied from the logic circuit 103 and supplies the latched data to a peripheral circuit.

Figure 7:
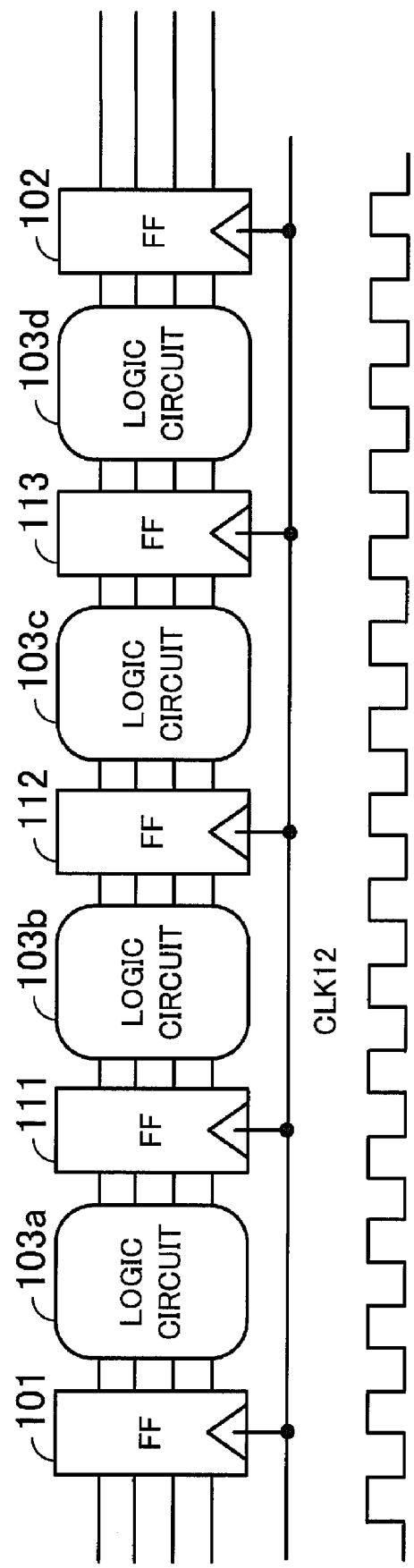
FIG. 7 is a block diagram illustrating a case where FF circuits are serially inserted in the logic circuit of FIG. 6 to realize super pipeline processing.

FIG. 7 is a block diagram illustrating a case where FF circuits are serially inserted in the logic circuit of FIG. 6 to realize super pipeline processing. Since all circuit components shown in FIG. 7 are the same as those described in FIG. 6, the same reference numerals are given to them, and the description will not be repeated here.

In FIG. 7, the logic circuit 103 in FIG. 6 is divided into logic circuits 103a to 103d. Further, FF circuits 111 to 113 are inserted between the divided logic circuits 103a to 103d to serially connect the logic circuits 103a to 103d. Thus, four-stage pipeline processing circuit is realized. The FF circuits 101, 102, 111, 112 and 113 receive a clock CLK12 having a frequency four times that of the clock CLK11. In a case of applying the example of FIG. 3 to the example of FIG. 6, FF circuits are inserted in parallel in the FF circuits 101 and 102 of FIG. 6 and selectors are provided to realize a four-stage pipeline processing circuit.

The following formula (1) shows power consumption of the circuit in FIG. 6. Suppose that a leakage current is negligible.

$$P = F \cdot \sum_i^N \alpha_i \cdot P_i \quad (1)$$

F: clock frequency
αi: operation rate of gate i
Pi: charge and discharge power of gate i In a case of converting the logic circuit 103 in FIG. 6 into a super pipeline processing circuit, "N" increases by insertion of FF circuits. Further, "F" increases by increase of a clock frequency. The following formula (2) represents power consumption in the case where the logic circuit is divided into logic circuits in n stages to increase a clock frequency by n times.

$$P_{SP} = n \cdot F \cdot \left( \sum_i^{N_F} \alpha_i^{(F)} \cdot P_i^{(F)} + \sum_i^{M_F} \alpha_i^{(AF)} \cdot P_i^{(AF)} \right) + \\ n \cdot F \cdot \sum_i^{N_L} \alpha_i^{(L)} \cdot P_i^{(L)} + n \cdot F \cdot \sum_i^{N_C} \beta_i^{(C)} \cdot P_i^{(C)} \quad (2)$$

NF: number of original FFs
MF: number of FFs inserted for super pipeline processing
NL: number of basic gates in combinational circuit
Nc: number of buffers during each clock cycle
F: original clock frequency
$\alpha i^{(F)}$: operation rate of i-th FF
$\alpha i^{(AF)}$: operation rate of i-th added FF
$\alpha i^{(L)}$: operation rate of i-th gate in combinational circuit
$\beta i^{(C)}$: operation rate of i-th clock buffer
$Pi^{(F)}$: power consumption of i-th FF
$Pi^{(AF)}$: power consumption of i-th added FF
$Pi^{(L)}$: power consumption of i-th gate in combinational circuit
$Pi^{(C)}$: power consumption of i-th clock buffer A first term of the formula (2) represents power consumption in the original FF circuits of the logic circuit. A second term represents power consumption in the FF circuits added by the pipeline processing. A third item represents power consumption in the logic circuit. A fourth item represents power consumption in the clock circuit.

Comparing the formula (2) with the formula (1), the following will be seen: in the formula (2), the second term is added due to addition of FF circuits. Since an operating frequency of the entire circuit increases by n times, each term is multiplied by n.

In the case of providing in parallel the FF circuits on the input and output sides of the logic circuit to realize serial data processing as shown in FIG. 3, the power consumption is represented by the following formula (3).

$$P_{PAL} = F \cdot \sum_{i}^{N_F} n \cdot \alpha_i^{(F)} \cdot P_i^{(F)} + \qquad (3)$$

$$n \cdot F \cdot \sum_{i}^{N_L} \alpha_i^{(L)} \cdot P_i^{(L)} + n \cdot F \cdot \sum_{i}^{N_S} \alpha_i^{(S)} \cdot P_i^{(S)} + F \cdot \sum_{i}^{N_C} \beta_i^{(C)} \cdot P_i^{(C)}$$

Ns: number of added selectors
$\alpha i^{(S)}$: operation rate of i-th selector
$Pi^{(S)}$: power consumption of i-th selector A first term of the formula (3) represents power consumption in the FF circuits. A second term represents power consumption in the logic circuit. A third item represents power consumption in the selectors. A fourth item represents power consumption in the clock circuit.

Comparing the formula (3) with the formula (1), the following will be seen: in the formula (3), the third term representing the power consumption in the selectors is added. Since the number of FF circuits increases by n times, the first term is multiplied by n. Since n data sets propagate through the logic circuit during each clock cycle, an operation rate of the circuit increases by n times and therefore, the power consumption represented by the second term increases by n times.

The following formula (4) represents a difference between the power consumption represented by the formula (3) and that represented by the formula (2).

$$P_{PAL} - P_{SP} = \qquad (4)$$

$$n \cdot F \cdot \sum_{i}^{N_S} \alpha_i^{(S)} \cdot P_i^{(S)} - (n-1) \cdot F \cdot \sum_{i}^{N_C} \beta_i^{(C)} \cdot P_i^{(C)} - n \cdot F \cdot \sum_{i}^{M_F} \alpha_i^{(AF)} \cdot P_i^{(AF)}$$

A first term represents an increase in power consumption due to addition of the selectors. A second term represents a power consumption difference due to differences in clock frequencies. Specifically, the clock frequency increases by n times in the pipeline processing of FIG. 7, while the clock frequency is constant in the serial data processing of FIG. 3. A third term represents power consumption in the FF circuits added by the pipeline processing.

In formula (4), the operation rate is designated as an average operation rate $\alpha$. The number of the added FF circuits, which is supposed to be n times (n stages) the number of original FF circuits, is designated as $n \cdot N_F$. Power consumption of the FF circuits is estimated at $q \cdot P\epsilon$. As a result, the formula (4) is transformed to the following formula (5).

$$P_{PAL} - P_{SP} = n \cdot F \cdot \alpha \cdot N_S \cdot (k - n \cdot q) \cdot P_\varepsilon - (n-1) \cdot F \cdot \sum_{i}^{N_C} \beta_i^{(C)} \cdot P_i^{(C)} \qquad (5)$$

Normally, k is two in the two-input selector, three in the three-input selector, and six in the six-input selector, whereas q is ten. Accordingly, the first term has a negative value, which decreases with increase of the factor n. Meanwhile, the second term has a value equal to or smaller than zero.

Thus, in the case of providing in parallel the FF circuits on the input and output sides of the logic circuit to realize a serial data processing circuit, a significant power reduction is achieved as compared with the case of serially inserting the FF circuits 111 to 113 between the logic circuits 103a to 103d of FIG. 7 to realize a pipeline processing circuit.

Figure 8:
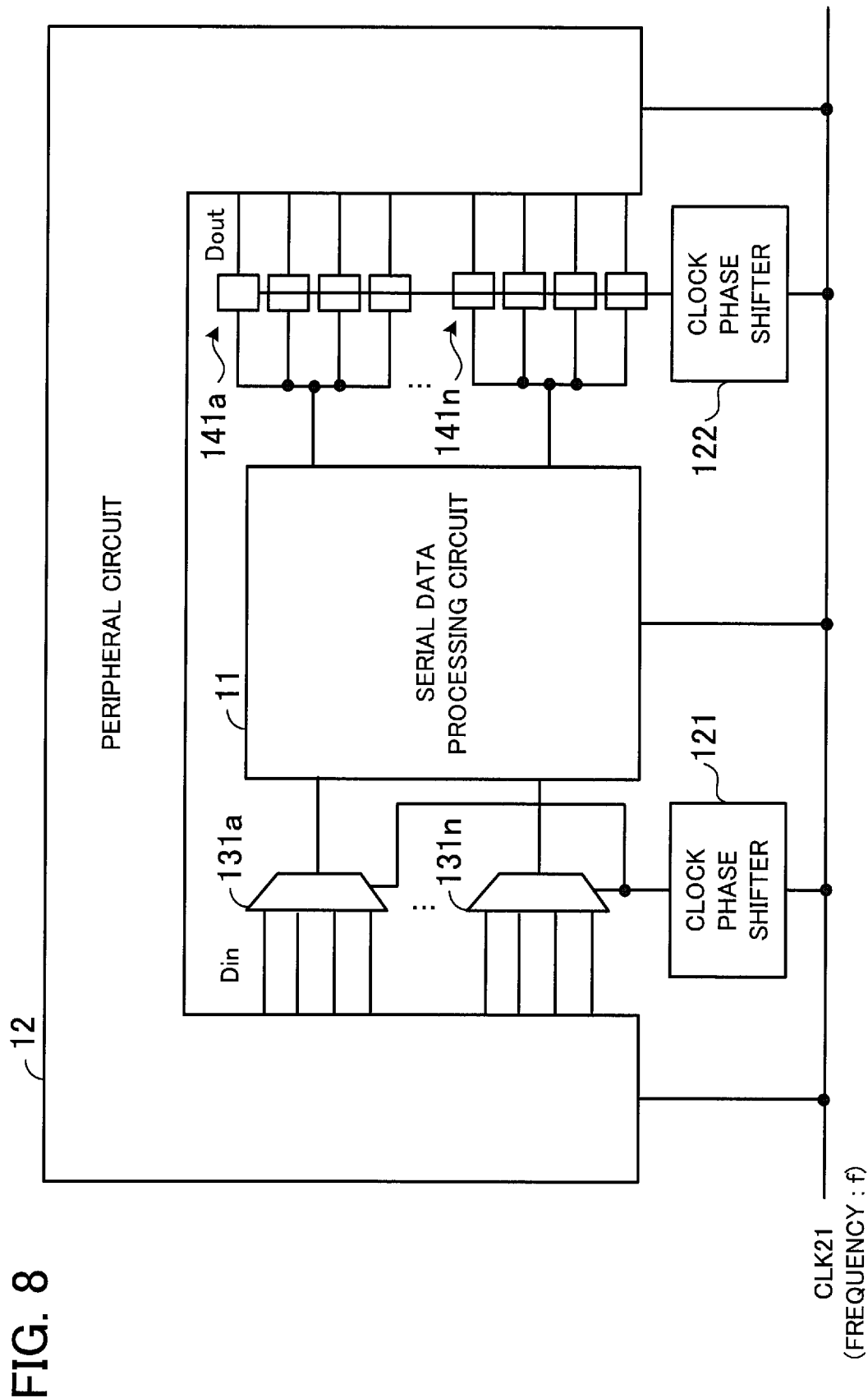
FIG. 8 is a block diagram of another data processor.

FIG. 8 is a block diagram of another data processor. The data processor of FIG. 2 is designed such that a frequency of the peripheral circuit 12 is N times that of the serial data processing circuit 11 and the data sets Din are supplied to the serial data processing circuit 11. The data processor of FIG. 8 is designed as follows. The data sets Din supplied from the peripheral circuit 12 to the serial data processing circuit 11 are converted into serial data sets and the serial data sets are supplied to the serial data processing circuit 11. At the same time, the serial data sets supplied from the serial data processing circuit 11 are converted into parallel data sets and the parallel data sets are supplied to the peripheral circuit 12. Since all circuit components shown in FIG. 8 are the same as those described in FIG. 2, the same reference numerals are given to them, and the description will not be repeated here.

As shown in FIG. 8, the data processor has clock phase shifters 121 and 122. Selectors 131a, . . . , 131n are provided on the input side of the serial data processing circuit 11. FF circuit groups 141a, . . . , 141n are provided on the output side of the serial data processing circuit 11.

The clock phase shifter 121 supplies to the selectors 131a, . . . , 131n a clock phase-shifted by $2\pi/N$. Based on this clock, the selectors 131a, . . . , 131n convert N data sets Din supplied from the peripheral circuit 12 into N serial data sets during each clock cycle and supply the parallel-to-serial converted data sets to the serial data processing circuit 11.

The clock phase shifter 122 supplies to the FF circuit groups 141a, . . . , 141n a clock phase-shifted by $2\pi/N$. Based on this clock, the FF circuits groups 141a, . . . , 141n convert N serial data sets included in the serial data processing circuit 11 during each clock cycle into parallel data sets and supply the serial-to-parallel converted data sets Dout to the peripheral circuit 12.

Thus, the data sets supplied to and from the serial data processing circuit 11 are subjected to parallel-to-serial conversion and serial-to-parallel conversion. As a result, the present embodiment operates the serial data processing circuit 11 and the peripheral circuit 12 with a clock CLK 21 having the same frequency.

Figure 9:
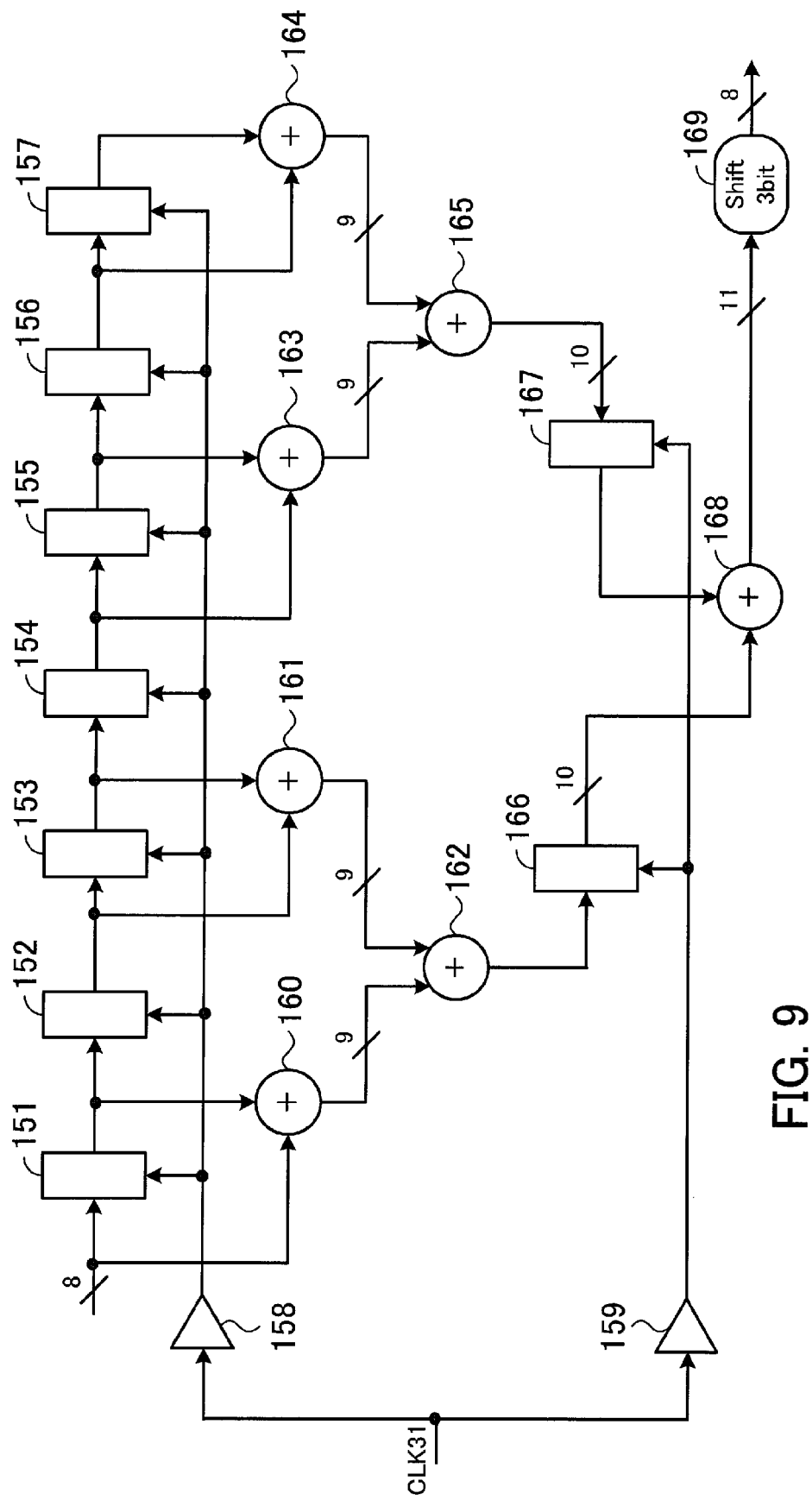
FIG. 9 is a circuit diagram of an FIR filter.

FIG. 9 is a circuit diagram of an FIR filter. As shown in FIG. 9, the FIR (Finite Impulse Response) filter has 8-bit input/output FF circuits 151 to 157, 10-bit input/output FF circuits 166 and 167, clock buffers 158 and 159, 8-bit input/9-bit output adders 160, 161, 163, and 164, 9-bit input/10-bit output adders 162 and 165, 10-bit input/11-bit output adder 168, and shift circuit 169. The FIR filter in FIG. 9 is an 8-tap FIR filter. The FIR filter sequentially receives and filters 8-bit data and produces a filtering result after rounding it to 8-bits.

The FF circuits 151 to 157 receive a clock CLK31 via the clock buffer 158. The FF circuit 151 receives 8-bit data to be filtered. The FF circuits 151 to 157 supply the sequentially received data to the downstream FF circuits 151 to 157 in synchronization with the clock CLK31.

The adder 160 receives the currently supplied data and the data supplied one clock ago. The adder 160 adds these data sets together and supplies the addition result to the adder 162.

The adder 161 receives the data supplied two clocks ago and the data supplied three clocks ago. The adder 161 adds these data sets together and supplies the addition result to the adder 162.

The adder 162 adds the data supplied from the adder 160 and the data supplied from the adder 161 together, and supplies the addition result to the FF circuit 166.

The adder 163 receives the data supplied four clocks ago and the data supplied five clocks ago. The adder 163 adds these data sets together and supplies the addition result to the adder 165.

The adder 164 receives the data supplied six clocks ago and the data supplied seven clocks ago. The adder 164 adds these data sets together and supplies the addition result to the adder 165.

The adder 165 adds the data supplied from the adder 163 and that supplied from the adder 164 together, and supplies the addition result to the FF circuit 167.

The FF circuits 166 and 167 receive the clock CLK31 via the clock buffer 159. The FF circuits 166 and 167 latch the data sets supplied from the adder 162 and the adder 165, respectively, and supply the latched data sets to the adder 168.

The adder 168 adds the data sets supplied from the FF circuits 166 and 167, and supplies the addition result to the shifter 169. The shifter 169 shifts by 3 bit positions toward the LSB (Least Significant Bit) direction the 11-bit data supplied from the adder 168. That is, the shifter 169 divides by 8 the addition data sets equivalent to eight data sets supplied to the FIR filter, thereby obtaining an average value.

Figure 10:
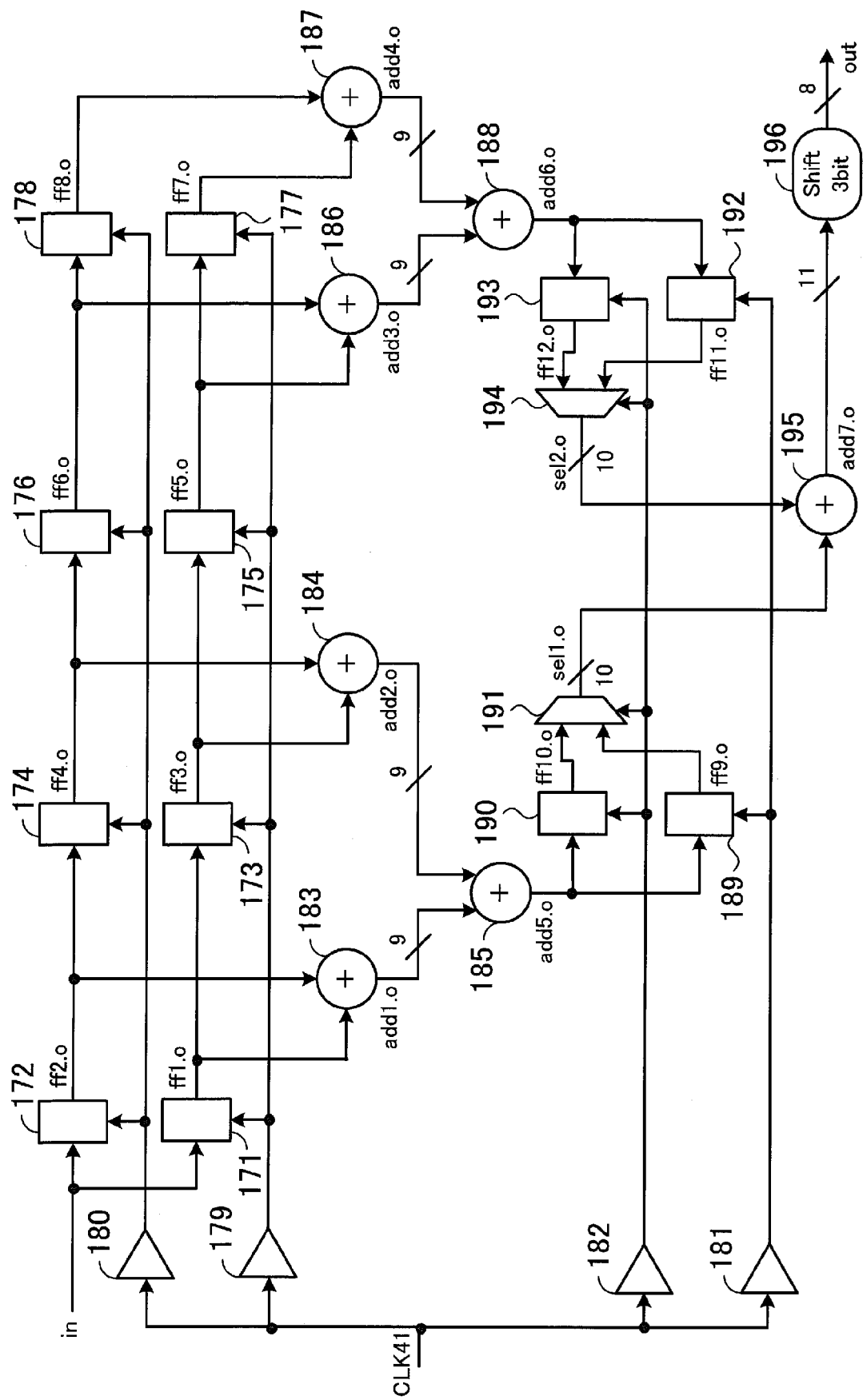
FIG. 10 is a circuit diagram of an FIR filter in which FF circuits are inserted in parallel in the FIR filter of FIG. 9 to realize pipeline processing.

FIG. 10 is a circuit diagram of an FIR filter designed to process two serial data sets. The FIR filter shown in FIG. 10 has FF circuits 171 to 178, 189, 190, 192, and 193, clock buffers 179 to 182, adders 183 to 188 and 195, selectors 191 and 194, and a shifter 196.

When associating the adder 195 and shifter 196 in FIG. 10 with the logic circuit 81 in FIG. 3, the FF circuits 189 and 190, and FF circuits 192 and 193 in FIG. 10 correspond to the FF circuits 31 to 34 in FIG. 3, and the selectors 191 and 194 in FIG. 10 correspond to the selectors 41 to 44 in FIG. 3. When associating the adders 183 to 188 in FIG. 10 with the logic circuit 81 in FIG. 3, the FF circuits 189 and 190, and FF circuits 192 and 193 in FIG. 10 correspond to the FF circuits 61 to 64 in FIG. 3, and the selectors 191 and 194 in FIG. 10 correspond to the selectors 71 to 74 in FIG. 3. The FF circuits 171 to 178 in FIG. 10 correspond to the peripheral circuit 12 (circuit for supplying data to the serial data processing circuit 11) in FIG. 2.

That is, the FIR filter in FIG. 10 is a circuit in which the FF circuits are inserted in parallel in the FF circuits 166 and 167 of FIG. 9 and the selectors are provided to convert the FIR filter of FIG. 9 into a circuit for processing two serial data sets.

The FF circuits 171, 173, 175, and 177 receive a clock CLK41 via the clock buffer 179. The FF circuit 171 receives 8-bit data to be filtered. The FF circuits 171, 173, 175, and 177 supply the sequentially received data sets to the downstream FF circuits 171, 173, 175, and 177 in synchronization with the clock CLK41.

The FF circuits 172, 174, 176, and 178 receive the clock CLK41 via the clock buffer 180. The FF circuit 172 receives 8-bit data to be filtered. The FF circuits 172, 174, 176, and 178 supply the sequentially received data sets to the downstream FF circuits 172, 174, 176, and 178 in synchronization with the clock CLK41.

The FF circuits 171, 173, 175, and 177 are positive edge-triggered FF circuits, whereas the FF circuits 172, 174, 176, and 178 are negative edge-triggered FF circuits. That is, the FF circuits 171 and 172 receive the clocks CLK41 having a phase difference of $\pi$. When the FF circuits 171 to 178 are the same edge-triggered FF circuits, a delay circuit having a phase difference of $\pi$ is provided on the output side of any one of the clock buffers 179 and 180.

The adder 183 receives the data supplied from the FF circuit 171 and the data supplied from the FF circuit 172. The adder 183 adds these data sets together and supplies the addition result to the adder 185.

The adder 184 receives the data supplied from the FF circuit 173 and the data supplied from the FF circuit 174. The adder 184 adds these data sets together and supplies the addition result to the adder 185.

The adder 185 adds the data supplied from the adder 183 and the data supplied from the adder 184 together, and supplies the addition result to the FF circuits 189 and 190.

The adder 186 receives the data supplied from the FF circuit 175 and the data supplied from the FF circuit 176. The adder 186 adds these data sets together and supplies the addition result to the adder 188.

The adder 187 receives the data supplied from the FF circuit 177 and the data supplied from the FF circuit 178. The adder 187 adds these data sets together and supplies the addition result to the adder 188.

The adder 188 adds the data supplied from the adder 186 and the data supplied from the adder 187, and supplies the addition result to the FF circuits 192 and 193.

The FF circuit 189 receives the clock CLK41 via the clock buffer 181. In synchronization with the clock CLK41, the FF circuit 189 supplies to the selector 191 the data supplied from the adder 185.

The FF circuit 190 receives the clock CLK41 via the clock buffer 182. In synchronization with the clock CLK41, the FF circuit 190 supplies to the selector 191 the data supplied from the adder 185.

The FF circuit 189 is a positive edge-triggered FF circuit, whereas the FF circuit 190 is a negative edge-triggered FF circuit. That is, the FF circuits 189 and 190 receive the clocks CLK41 having a phase difference of $\pi$. When the FF circuits 189 and 190 are the same edge-triggered FF circuits, a delay circuit having a phase difference of $\pi$ is provided on the output side of any one of the clock buffers 181 and 182.

The selector 191 receives the clock CLK41 via the clock buffer 182. The selector 191 selects any one of the data sets supplied from the FF circuits 189 and 190, and supplies the selected data to the adder 195 based on the state '0 or 1' of the clock CLK41.

The FF circuit 192 receives the clock CLK41 via the clock buffer 181. In synchronization with the clock CLK41, the FF circuit 192 supplies to the selector 194 the data supplied from the adder 188.

The FF circuit 193 receives the clock CLK41 via the clock buffer 182. In synchronization with the clock CLK41, the FF circuit 193 supplies to the selector 194 the data supplied from the adder 188.

The FF circuit 192 is a positive edge-triggered FF circuit, whereas the FF circuit 193 is a negative edge-triggered FF circuit. That is, the FF circuits 192 and 193 receive the clocks CLK41 having a phase difference of $\pi$. When the FF circuits 192 and 193 are the same edge-triggered FF circuits, a delay circuit having a phase difference of $\pi$ is provided on the output side of any one of the clock buffers 181 and 182.

The selector 194 receives the clock CLK41 via the clock buffer 182. The selector 194 selects any one of the data sets supplied from the FF circuits 192 and 193, and supplies the selected data to the adder 195 based on the state '0 or 1' of the clock CLK41.

The adder 195 adds the data sets supplied from the selectors 191 and 194, and supplies the addition result to the shifter 196. The shifter 196 shifts by 3 bits positions toward the LSB direction the 11-bit data supplied from the adder 195 to produce 8 bit-data.

Figure 11:
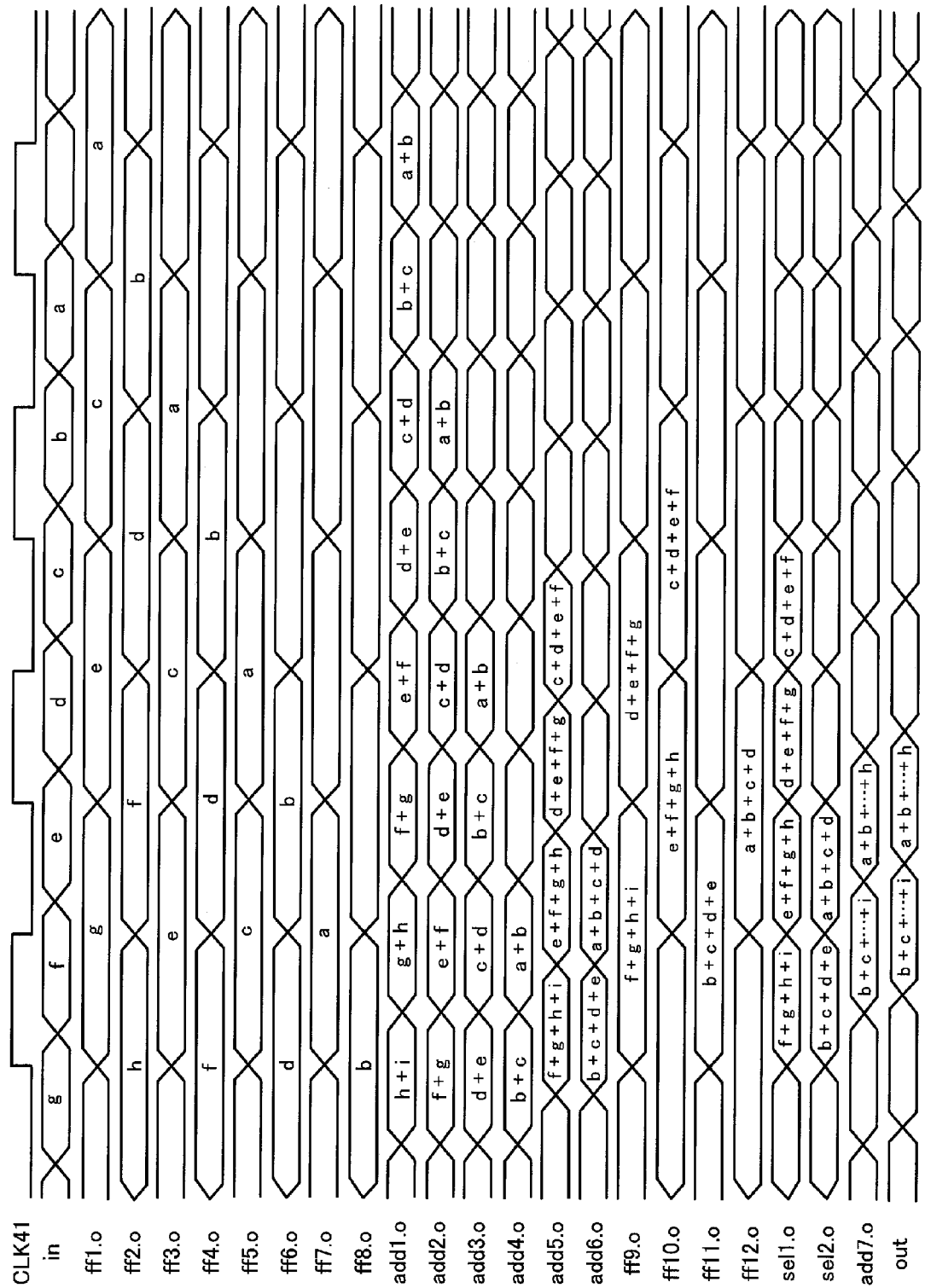
FIG. 11 is a timing chart of the circuit of FIG. 10.

FIG. 11 is a timing chart of the circuit of FIG. 10. FIG. 11 shows a signal waveform of an output of each section shown in FIG. 10.

The FIR filter in FIG. 10 receives data sets including data (a), data (b), data (c), . . . as indicated at "in" in FIG. 11.

The FF circuit 171 latches the data (in) on the positive edge of the clock CLK41. Accordingly, the FF circuit 171 has an output as indicated at "ff1.o" in FIG. 11.

The FF circuits 173, 175, and 177 sequentially latch the data supplied from the FF circuit 171 while delaying the output by one clock cycle. Accordingly, the FF circuits 173, 175, and 177 have outputs as indicated at "ff3.o", "ff5.o", and "ff7.o" in FIG. 11, respectively.

The FF circuit 172 latches the data (in) on the negative edge of the clock CLK41. Accordingly, the FF circuit 172 has an output as indicated at "ff2.o" in FIG. 11.

The FF circuits 174, 176, and 178 sequentially latch the data supplied from the FF circuit 172 while delaying the output by one clock cycle. Accordingly, the FF circuits 174, 176, and 178 have outputs as indicated at "ff4.o", "ff6.o", and "ff8.o" in FIG. 11, respectively.

The adder 183 adds the outputs of the FF circuits 171 and 172. Accordingly, the adder 183 has an output as indicated at "add1.o" in FIG. 11, which is a value obtained by adding "ff1.o" and "ff2.o".

The adder 184 adds the outputs of the FF circuits 173 and 174. Accordingly, the adder 184 has an output as indicated at "add2.o" in FIG. 11, which is a value obtained by adding "ff3.o" and "ff4.o".

The adder 186 adds the outputs of the FF circuits 175 and 176. Accordingly, the adder 186 has an output as indicated at "add3.o" in FIG. 11, which is a value obtained by adding "ff5.o" and "ff6.o".

The adder 187 adds the outputs of the FF circuits 177 and 178. Accordingly, the adder 187 has an output as indicated at "add4.o" in FIG. 11, which is a value obtained by adding "ff7.o" and "ff8.o".

The adder 185 adds the outputs of the adders 183 and 184. Accordingly, the adder 185 has an output as indicated at "add5.o" in FIG. 11, which is a value obtained by adding "add1.o" and "add2.o".

The adder 188 adds the outputs of the adders 186 and 187. Accordingly, the adder 188 has an output as indicated at "add6.o" in FIG. 11, which is a value obtained by adding "add3.o" and "add4.o".

The FF circuit 189 latches, on the positive edge of the clock CLK41, the data supplied from the adder 185. Accordingly, the FF circuit 189 has an output as indicated at "ff9.o" in FIG. 11.

The FF circuit 190 latches, on the negative edge of the clock CLK41, the data supplied from the adder 185. Accordingly, the FF circuit 190 has an output as indicated at "ff10.o" in FIG. 11.

The FF circuit 192 latches, on the positive edge of the clock CLK41" the data supplied from the adder 188. Accordingly, the FF circuit 192 has an output as indicated at "ff11.o" in FIG. 11.

The FF circuit 193 latches, on the negative edge of the clock CLK41, the data supplied from the adder 188. Accordingly, the FF circuit 193 has an output as indicated at "ff12.o" in FIG. 11.

The selector 191 selects any one of the data sets supplied from the FF circuits 189 and 190, and supplies the selected data to the adder 195 in synchronization with the clock CLK41. Accordingly, the selector 191 has an output as indicated at "sel1.o" in FIG. 11.

The selector 194 selects any one of the data sets supplied from the FF circuits 192 and 193, and supplies the selected data to the adder 195 in synchronization with the clock CLK41. Accordingly, the selector 194 has an output as indicated at "sel2.o" in FIG. 11.

The adder 195 adds the outputs of the selectors 191 and 194. Accordingly, the adder 195 has an output as indicated at "add7.o" in FIG. 11.

The shifter 196 shifts by 3 bits the output of the adder 195. Accordingly, the shifter 196 has an output as indicated at "out" in FIG. 11.

Thus, the FIR filter for processing two serial data sets shown in FIG. 10 filters the incoming data (in).

Figure 12:
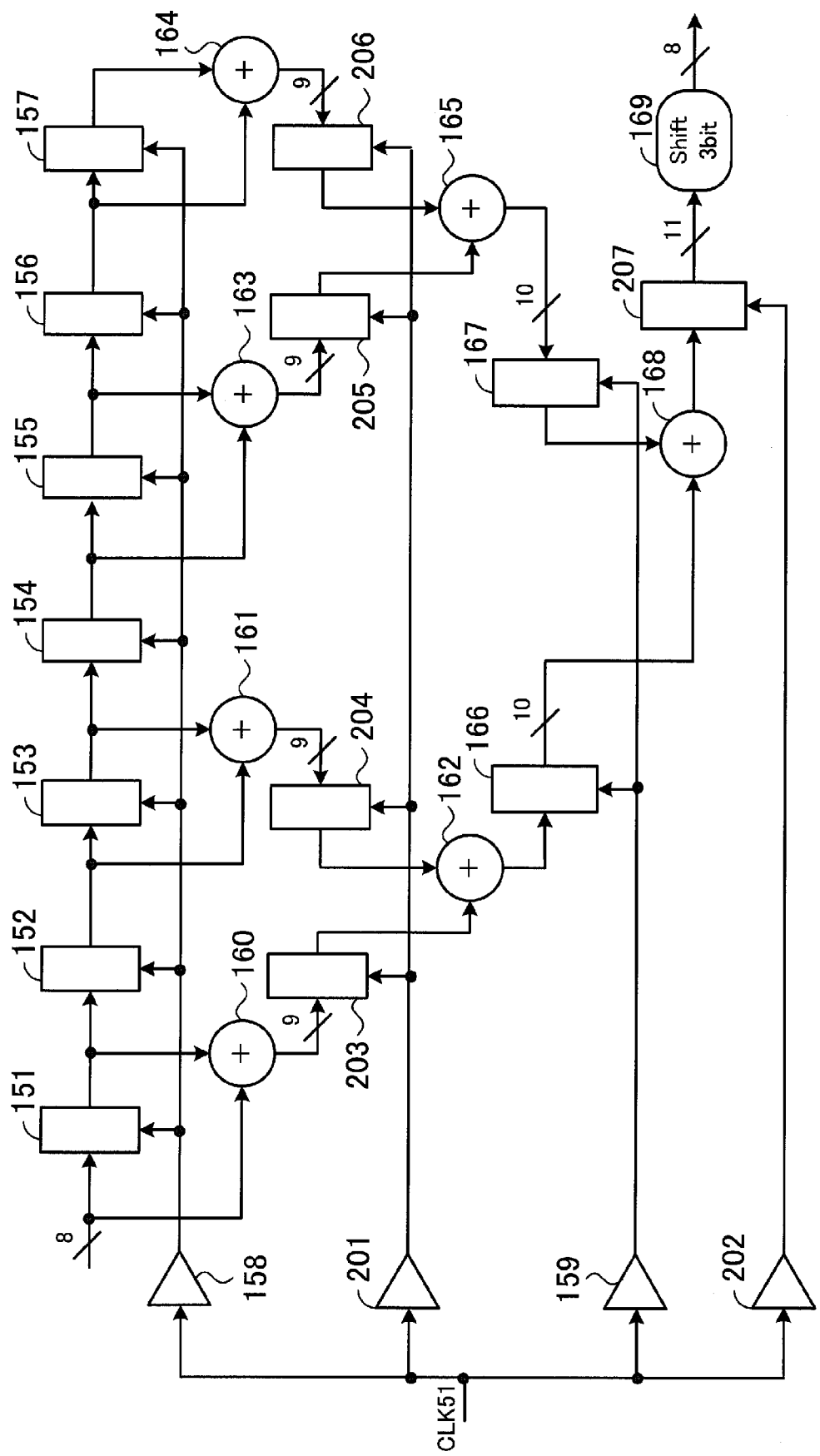
FIG. 12 is a circuit diagram of an FIR filter in which FF circuits are serially inserted in the FIR filter of FIG. 9 to realize pipeline processing.

FIG. 12 is a circuit diagram of an FIR filter in which FF circuits are serially inserted in the FIR filter of FIG. 9 to realize pipeline processing. That is, an FIR filter of FIG. 12 is a two-stage pipeline processing circuit obtained by converting the FIR filter of FIG. 9. Since all circuit components shown in FIG. 12 are the same as those described in FIG. 9, the same reference numerals are given to them, and the description will not be repeated here.

In the FIR filter of FIG. 12, an FF circuit 203 is inserted between the adders 160 and 162, and an FF circuit 204 is inserted between the adders 161 and 162, respectively. Likewise, an FF circuit 205 is inserted between the adders 163 and 165, and an FF circuit 206 is inserted between the adders 164 and 165, respectively. An FF circuit 207 is inserted between the adder 168 and the shifter 169.

When associating the circuit of FIG. 12 with that of FIG. 7, the FF circuits 203 to 206 in FIG. 12 correspond to the FF circuit 111 in FIG. 7, and the FF circuit 207 in FIG. 12 corresponds to the FF circuit 112 in FIG. 7. That is, the FIR filter of FIG. 12 is a circuit in which the FF circuits 203 to 206 and the FF circuit 207 are serially inserted in the FIR filter of FIG. 9 to realize two-stage pipeline processing.

The FF circuits 203 to 206 receive a clock CLK51 via a clock buffer 201. The FF circuit 207 receives the clock CLK51 via a clock buffer 202.

A frequency of the clock CLK51 is twice that of the clock CLK31 of FIG. 9. When the FF circuits 203 to 206 and the FF circuit 207 are serially inserted in the FIR filter of FIG. 9 to convert the FIR filter of FIG. 9 into a two-stage pipeline processing circuit, the frequency of the clock CLK51 can be made twice that of the clock CLK31 of FIG. 9.

A reduction effect of power consumption in the FIR filter of FIG. 10 is estimated. When comparing the number of gates in the FIR filter of FIG. 10 with that in the FIR filter of FIG. 12, the FIR filter of FIG. 12 has 123 FF circuits (calculated on the assumption that one filter is provided per bit), while the FIR filter of FIG. 10 has 104 FF circuits. Accordingly, the FIR filter of FIG. 10 has FF circuits less than that of FIG. 12 by 19. On the contrary, the number of selectors in the FIR filter of FIG. 10 increases by 20.

Suppose that power consumption in the selector having two inputs is 1.5 times that of Basic Cell (Basic Cell: NAND circuit or NOR circuit having two inputs) and power consumption in the FF circuit is ten times that of Basic Cell. In the formula (5), the first term representing an increment of power consumption in the selector and a reduction of power consumption in the FF circuit is as represented by the following formula (6).

$$\text{The first term} = 2 \cdot F \cdot \alpha \cdot 20 \cdot 1.5P - \\ (2 \cdot F \cdot \alpha \cdot 123 \cdot 10P - F \cdot \alpha \cdot 104 \cdot 10P) \\ = -1360 \cdot F \cdot \alpha \cdot P \quad (6)$$

Since formula (5) uses an approximation, the formula (6) is not directly derived from the formula (5) but derived from the formulas (2) and (3).

Further, the FIR filter of FIG. 12 has 14 clock buffers, while the FIR filter of FIG. 10 has 12 clock buffers. Suppose that the operation rate of a clock line is 2. The second term of the formula (5) is as represented by the following formula (7).

$$\text{The second term} = -F \cdot (2 \cdot 15 - 12) \cdot P^{(c)} \\ = -18 \cdot F \cdot P^{(c)} \quad (7)$$

A value obtained by adding formulas (6) and (7) together is the power reduction amount of the FIR filter of FIG. 10 to the FIR filter of FIG. 12.

Thus, by inserting in parallel the FF circuits 189, 190, 192, and 193 and the selectors 191 and 194 in the logic circuit of the FIR filter in FIG. 9 to convert the FIR filter of FIG. 9 into a circuit for processing serial data sets, the present embodiment realizes the same performance as that of the pipeline processing with low power consumption.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A serial data processing circuit, comprising:
   a latch unit including N latches connected to output signal lines from a logic circuit to sequentially latch output data sets from the logic circuit and to output N data sets in parallel; and
   a selector for sequentially selecting the data sets supplied from the latch unit and converting the sequentially selected data sets into serial data for one signal line to supply the serial data to the next logic circuit,
   wherein the latch unit comprises a negative edge-triggered latch and a positive edge-triggered latch; and
   the serial data processing circuit further comprises a clock delay source for supplying, to each of the N latches, synchronous clocks shifted from each other by 2/N cycle.

2. The serial data processing circuit according to claim 1, wherein the N latches latch the incoming data sets at timings of clock frequencies supplied to the latches, the timings being different from each other by 1/N cycle.

3. The serial data processing circuit according to claim 2, further comprising a clock delay source for supplying to each of the N latches the synchronous clocks shifted from each other by 1/N cycle.

4. A serial data processing circuit, comprising:
   a latch unit including N latches connected to output signal lines from a logic circuit to sequentially latch output data sets from the logic circuit and to output N data sets in parallel; and
   a selector for sequentially selecting the data sets supplied from the latch unit and converting the sequentially selected data sets into serial data for one signal line to supply the serial data to the next logic circuit,
   wherein input data sets from a peripheral circuit are converted every N data sets into N serial data sets during each clock cycle and supplied to the logic circuit or the output data sets from the logic circuit are sequentially latched by the N latches and supplied in parallel to the peripheral circuit.

5. The serial data processing circuit according to claim 4, wherein the N latches latch the incoming data sets at timings of clock frequencies supplied to the latches, the timings being different from each other by 1/N cycle.

6. The serial data processing circuit according to claim 5, further comprising a clock delay source for supplying to each of the N latches the synchronous clocks shifted from each other by 1/N cycle.

7. A serial data processing circuit, comprising:
   a latch unit including N latches connected to output signal lines from a logic circuit to sequentially latch output data sets from the logic circuit and to output N data sets in parallel; and
   a selector for sequentially selecting the data sets supplied from the latch unit and converting the sequentially selected data sets into serial data for one signal line to supply the serial data to the next logic circuit,
   wherein the logic circuit receives input data sets from a peripheral circuit and supplies output data sets to the peripheral circuit that operates at a frequency N times that of the logic circuit.

8. The serial data processing circuit according to claim 7, wherein the N latches latch the incoming data sets at timings of clock frequencies supplied to the latches, the timings being different from each other by 1/N cycle.

9. The serial data processing circuit according to claim 8, further comprising a clock delay source for supplying to each of the N latches the synchronous clocks shifted from each other by 1/N cycle.

10. A serial data processing circuit, comprising:
    a latch unit including N latches connected to output signal lines from a logic circuit to sequentially latch output data sets from the logic circuit and to output N data sets in parallel; and a selector for sequentially selecting the data sets supplied from the latch unit and converting the sequentially selected data sets into serial data for one signal line to supply the serial data to the next logic circuit, wherein M/N latches are serially connected to the logic circuit for signal-processing, by M data sets, the data sets supplied from a peripheral circuit that operates at a frequency N times that of the logic circuit, parallel latch circuits including the N serially connected latches are connected to output terminals from the periphery circuit, clocks having the same frequency as that of the logic circuit but shifted from each other by 1/N cycle are supplied to the N parallel latch circuits to latch the data sets from the peripheral circuit, and outputs from the respective latches are supplied as input data to the logic circuit.

11. The serial data processing circuit according to claim 10, wherein the N latches latch the incoming data sets at timings of clock frequencies supplied to the latches, the timings being different from each other by 1/N cycle.

12. The serial data processing circuit according to claim 11, further comprising a clock delay source for supplying to each of the N latches the synchronous clocks shifted from each other by 1/N cycle.

* * * * *